United States Patent [19]

Vajs et al.

[11] Patent Number: 4,665,644
[45] Date of Patent: May 19, 1987

[54] MOUSE AND RAT TRAP

[76] Inventors: Lubomir Vajs; Helena Vajs, both of 5580 Sheppard Ave. East, Ste. 1101, Toronto, Ont., Canada, M1B 2L3

[21] Appl. No.: 838,325
[22] Filed: Mar. 11, 1986
[51] Int. Cl.[4] .......................................... A01M 23/26
[52] U.S. Cl. .................................................. 43/82
[58] Field of Search ................ 43/81, 77, 82, 83, 83.5

[56] References Cited

U.S. PATENT DOCUMENTS

| | | | |
|---|---|---|---|
| 1,422,049 | 7/1922 | Gould | 43/82 |
| 2,068,492 | 1/1937 | Johnson | 43/83 |
| 2,068,865 | 1/1937 | Neuhausen | 43/83 |
| 2,209,522 | 7/1940 | Houtsinger | 43/83 |
| 2,724,209 | 11/1955 | Cain | 43/83.5 |
| 2,778,149 | 1/1957 | Edwards | 43/83.5 |
| 3,968,589 | 7/1976 | Basham | 43/81 |

FOREIGN PATENT DOCUMENTS

| | | | |
|---|---|---|---|
| 1039506 | 10/1978 | Canada | 43/82 |
| 800395 | 7/1936 | France | 43/83 |

Primary Examiner—Gene P. Crosby

[57] ABSTRACT

A molded plastic mouse or rat trap uses three separate molded pieces, namely a base, a striker and an actuator, which are releasably connected, in combination with metal springs for biasing the striker to a closed position. The spring or springs are supported on stab shafts of the striker for ease of assembly and operation. The arms of the spring or springs cooperate with the base and striker to bias the striker and provide the required force to kill a mouse. The striker is shaped to simplify setting of the trap and cooperate with the actuator for maintaining the striker in the set position.

15 Claims, 5 Drawing Figures

MOUSE AND RAT TRAP

FIELD OF THE INVENTION

The present invention relates to mouse and rat traps and particularly traps of an improved structure which are generally easier to use and of improved appearance.

Mouse traps have been in use for many years, and a host of different designs have been proposed. The most common mouse and rat trap is the wood base version having a wire striker biased by a coil spring, with the striker moving through approximately 180° to a separate set position and held there by a wire actuator.

More recently, a disposable mouse trap has been proposed in Canadian Pat. No. 1,139,562 which is made of a sheet-type material which is cut and folded in a particular manner with both the striker base and actuator being intergal and basically cut from, or a portion, cut from the sheet material. This trap has an elastic band biasing means for causing the structure to move rapidly to a forward portion of the base, and in so doing killing the mouse.

A slightly different version of the trap described in the above Canadian Patent has been disclosed, and is made of a molded plastic material where the striker is a separate molded piece having a shaft means either side of the striker rotatably received within the base. Again, this trap is biased by an elastic band.

The problems associated with many of the prior art traps is that these traps are somewhat awkward to set and there is the possibility that the trap will inadvertently be released, possibly causing damage to the hand of the user if inappropriately positioned. In some prior art proposals, remote setting means are used and the wire striker is completely enclosed within a housing, such that the user need not concern themselves with respect to gripping the trap as the striker and actual trap mechanism is located within the housing. A port is provided in to the housing to allow entry of the mouse. This approach seems somewhat extreme, when one considers that a trap is often a disposable item as there is a great reluctance to remove the mouse from the trap and sterlize the trap for resue. Generally, all mouse traps are fairly inexpensive and a large number of people prefer to treat them as a disposable item.

SUMMARY OF THE INVENTION

According to the present invention, a mouse or rat trap comprises a molded plastic base hingedly securing a striker at an elevated position adjacent an upper corner area of the base on either side of the base. The striker is of a molded plastic material and includes journal means either side of the striker received in appropriately sized apertures in the base adjacent the upper corner areas. At least one coil spring is carried on one of the journals, with one on the end of this spring partially overlying the striker and the opposite end retained by a vertical surface of the base. Movement of the striker upwardly from the base to a set position causes a strong spring bias urging the striker to a non-operative position in engagement with a forward portion of the base. An actuator means is hingedly secured to the base and movable to a position for maintaining the striker in an operative position. The actuator when depressed, moves to a non maintaining position freeing the striker to move rapidly under the influence of the at least one spring to the non-operative position which in cooperation with the base, results in a mouse being killed if positioned between the striker and the forward edge of the base. This trap takes advantage of the flexibility of a plastic molding operation, to size the journals of the striker to carry the coil springs in a manner to position and maintain the spring in operative engagement with the striker and the base. Preferably, two spring means are provided either side of the striker and intermediate the sides of the base to provide a strong spring bias urging the striker to be in engagement with a forward portion of the base. The coil springs are thus of a simplier design, lower cost and more readily available.

According to an aspect of the invention, a mouse or rat trap, is proposed which has a base, a striker hingedly secured to the base at an elevated position and spring means in engagement with the base and the striker, urging the striker to a striking position near the front end of the base. An actuator is pivotally secured to the base intermediate its length, with one end of the actuator extending beyond said base opposite said striking position for cooperation with the striker to releasably retain the striker in a set position, removed from said striking position and adapted to release said striker when depressed at the forward end of the actuator. The striker extends rearwardly of the base and is movable through an angle of less than 90° past a portion of the actuator, which passes through an aperture in the striker. Depression of the portion of the actuator extending through the striker serves to set the striker and retain it until such time as the forward end of the actuator is depressed. This trap provides a simple arrangement for setting of the trap where the user positions his hand under the base and at the rear of the striker, whereby there is no danger of having fingers in a position, which if the striker is released, may cause damage. In effect, the striker is shaped to cooperate with the actuator, whereby the person's motion to set the striker will also result in the actuator passing through an aperture in the striker and thereafter the actuator is almost automatically pressed against the lower part of the striker to effect setting of the striker.

BRIEF DESCRIPTION OF THE DRAWINGS

Preferred embodiments of the invention are shown in the drawings wherein.

DETAILED DESCRIPTION OF THE PREFERRED EMBODIMENT

Figure 1:
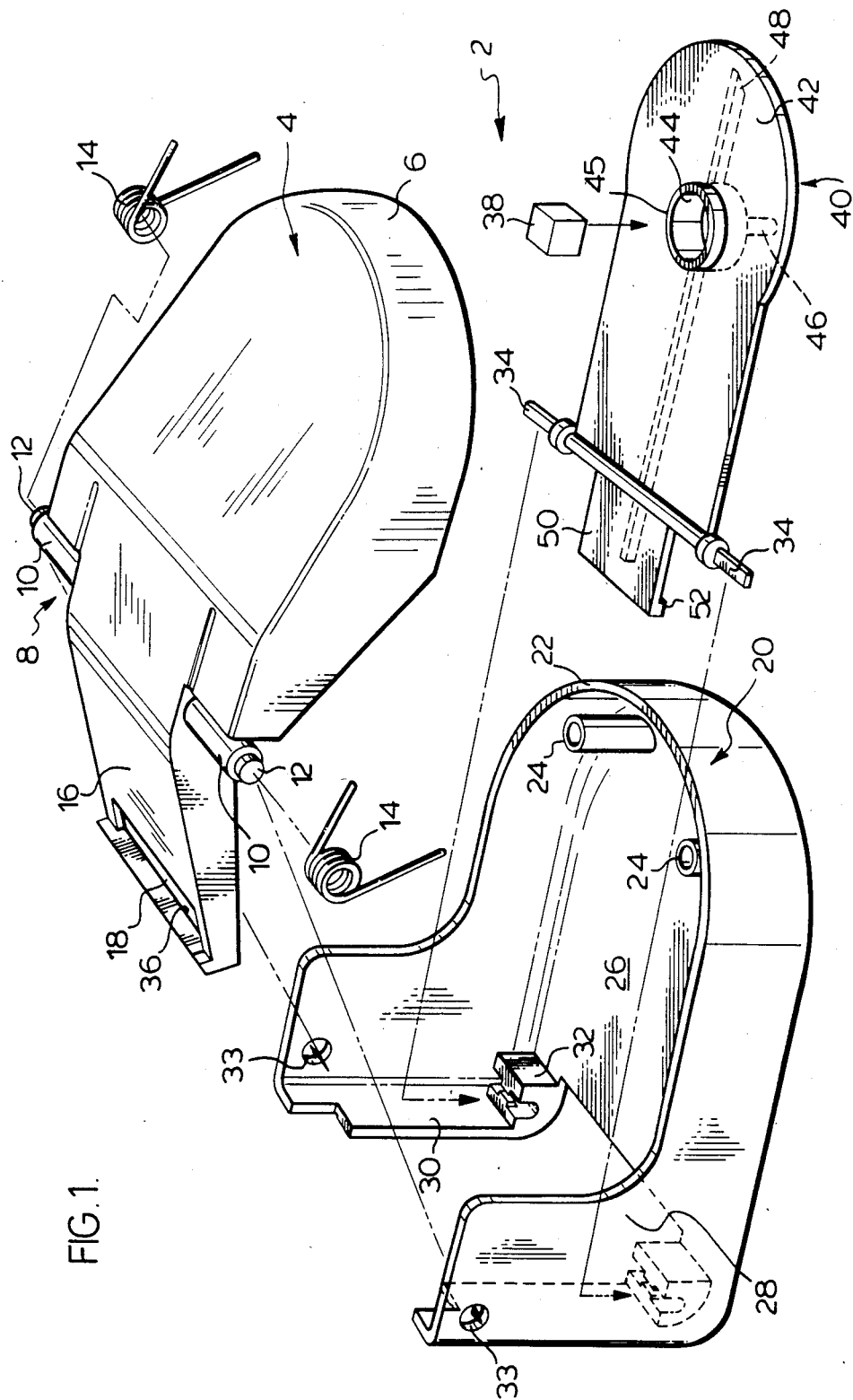
FIG. 1 is an exploded perspective view of the trap.

The trap generally shown as 2 in the drawings, is suitable for catching a mouse or rat or other small type animal and is designed to kill the same.

The trap shown is for mice and a larger, stronger version is required for rats. For example, the rat version would be larger and would have substantially stronger springs. For simplicity the invention will be described with respect to the mouse trap version, however, the overall structure and cooperation of components work satisfactorily for the larger rat version.

The striker 4, has a downwardly extending striking edge 6 adjacent the forward portion of the striker and is biased by coil springs 14 received on journals 8 and particularly by the major cylindrical section 10 of each journal. The trap preferably has two such coil springs 14, although it does work satisfactory with one spring.

A minor cylindrical section 12 is provided on each journal 8 and is adapted to be rotatably received within aperture 33 of the base 20. The striker has a rearwardly extending portion 16 which is depressed in order to set the trap. Adjacent the freeend of this rear portion 16, a slot-like aperture 18 is provided which cooperates with the rearward portion 50 of the actuator 40. This slot 18 is partially defined by the lip region 36 at the lower edge of aperture 18. This lip region 36 will cooperate with lip region 52 of the actuator 40.

The base 20 has a forward edge 22 for cooperating the striking edge 6 of the striker, and act as the active surfaces which will result in the animal being killed. The base 20 of the trap has a full floor portion 26 and at the rear thereof bearing-type blocks 32 are provided for receiving the stub shafts 34 of the actuator 40. At the forward end of the base, stop posts 24 are provided which limit the downward movement of the striker 4. The upper surface of these posts 24 engage the striking edge 6 to thereby determine an end position of the striker.

Figure 2:
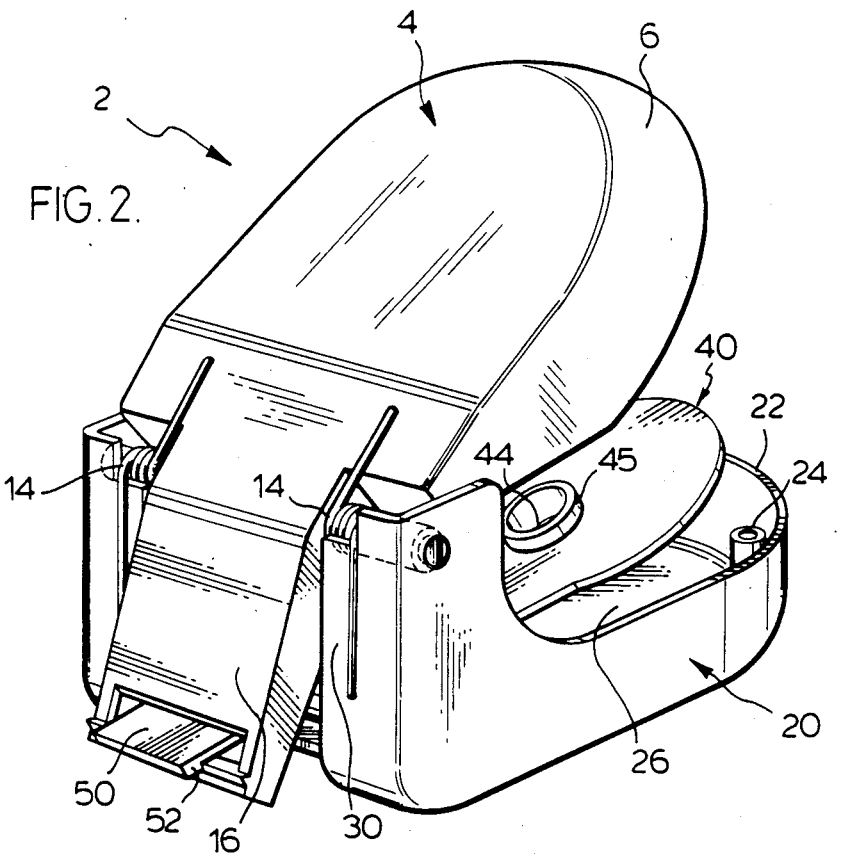
FIG. 2 is a perspective view of the trap.
Figure 3:
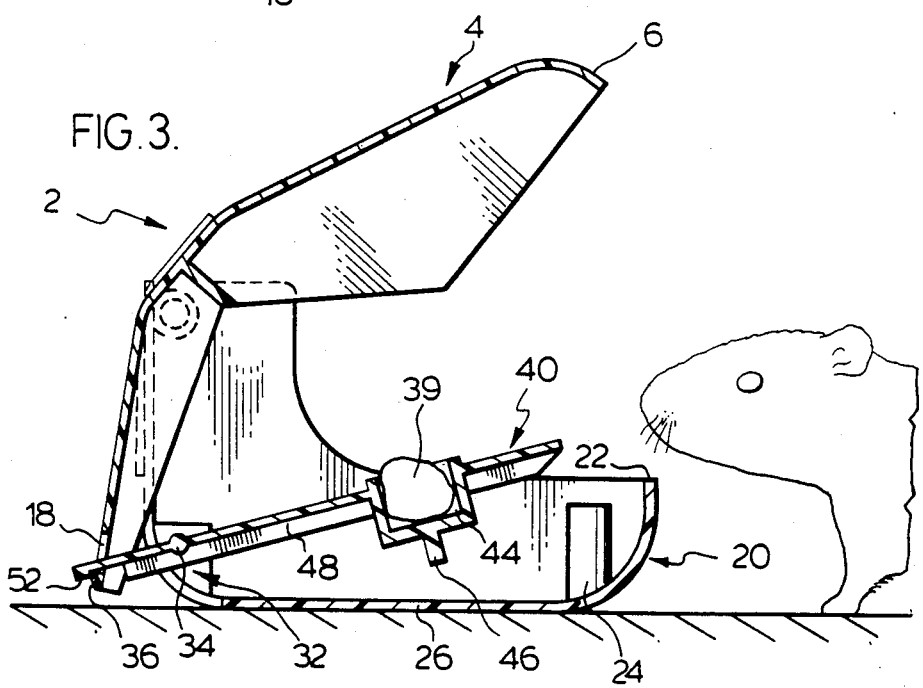
FIGS. 3 through 5 are side sections through the trap showing is operation.
Figure 4:
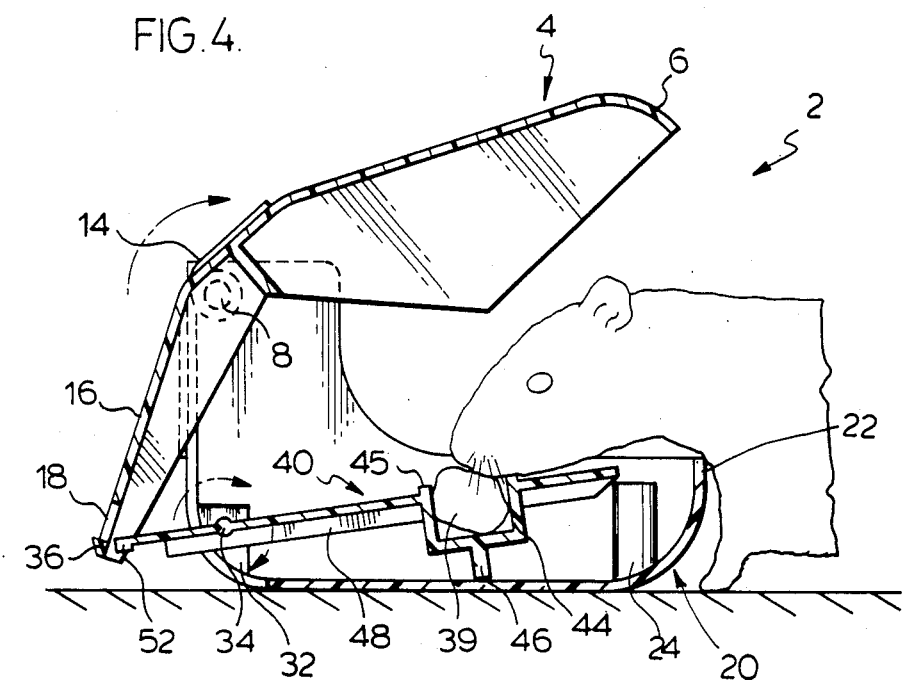
Figure 5:
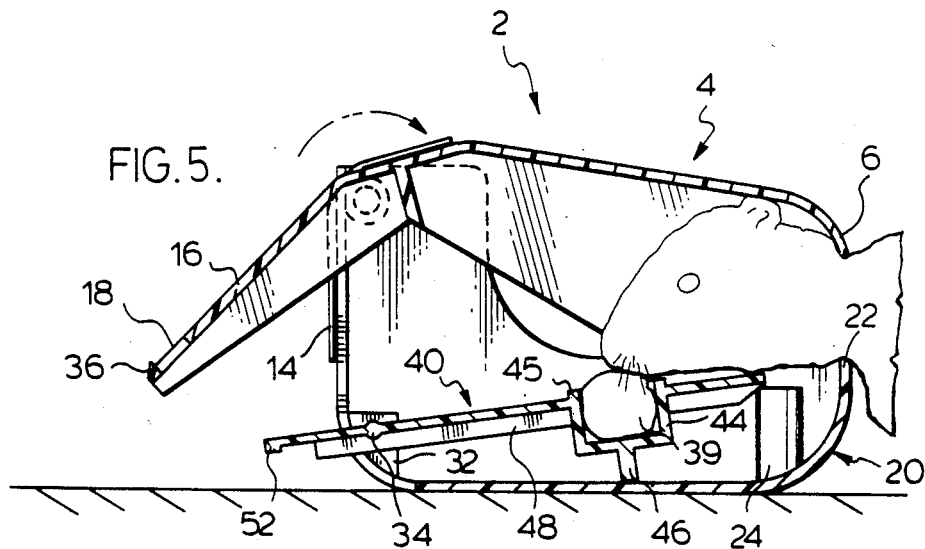

The actuator 40 has a front portion 42 which includes the bait recess area 44 having a raised lip region 45 thereabout. A cube permanent bait 38 is sized to snuggly engage bait recess 44. The corners of the cube shape bait engage the walls of the circular recess 44 and provide gaps between the cube and circular recess for removing of the bait. The bait is of a plastic preferably with an imitation smell of chocolate or peanut butter or other suitable smell. The bottom of the actuator includes a reinforcing rib 48 extending essentially the length of the actuator. This rib 48 stiffens the actuator and may or may not be necessary depending upon the thickness of the actuator. The bottom surface of the actuator 40 includes a stop post 46 which extends downwardly from the bait recess 44 to maintain a certain angle of the actuator 40 as generally shown in FIGS. 4 and 5. This end position of the actuator is such that setting of the trap is easily accomplished, as the actuator will extend through the striker and present a rear surface which when depressed against the striker, will hold the striker in the set position. This set position is shown in FIGS. 2 and 3 with lip region 36 of the striker in engagement with lip region 52 of the actuator. It should be noted that lip region 52 of the actuator cooperates with a "V" shaped lip region 36 of the striker to provide line contact when in engagement as shown in FIG. 3. This increases the sensitivity. As the mouse enters the mouth of the trap adjacent the forward portion of the base 4, the actuator is upwardly angled and the mouse or rat, attracted by the prebait 38 or actual bait 39, depresses the actuator 40 causing the same to release the striker to rapidly move towards the floor portion of the base 20 killing the mouse or rat.

The base member 20 has an open back portion for allowing the rear portion 16 of the striker to freely move within the base. The back walls of the base generally shown as 30 have an notched area adjacent the coil springs to allow one arm of the spring to extend beyond the shaft into engagement with the back wall 30 of the base, with the other arm of the spring overlying the top surface of the striker forward of the journals 8.

As can be appreciated from an review of FIGS. 2, 3 and 4, setting of the trap is extremely convenient. The rear portion 16 of the striker 4 is moved downwardly and adjacent the set position, the rear portion of the actuator 40 will pass through the slot-like opening 18. Once this has been completed, the person who will have gripped the striker with his thumb on the rearwardly extending tail portion 16 will merely shift his thumb somewhat depressing the rearward portion of the actuator 50 and letting up on the striker such that lip 36 of the striker comes into engagement with lip region 52 of the cooperating actuator. With the trap so set, the person can grab the upwardly extending side walls 28 of the base and finally locate the trap in its desired position. In this way, a person can actuate the trap with a single hand and is less likely to place his fingers between the striking edge 6 and edge 22 of the base portion. Furthermore, this arrangement allows convient opening of the trap for removal of a mouse, or rat at a remote position.

The trap as shown in the drawings is preferably made of a molded plastic, with the exception of the coil springs which are preferably metal. This striker, the actuator and base are all separately molded pieces and basically snap-fit together. The trap is inexpensive to produce, easily set and not unduly complicated. It should be noted that the tail portion 16 of the striker 4 and the forward portion of the striker are downwardly angled from the axis defined by the journals 8. This results in a reduced angle through which the striker is rotated from its rest postion against the stop post 24 to its set position shown in FIG. 2, making it more convient for the user. It is preferred to have the angle of rotation less than about 60° and preferably about 45°. It can be appreciated that the prior art traps which move the striker through an angle approaching or greater than 90° cause the user to use two hands to set this trap or require a fair degree of hand dexterity, whereby the chance of a person locating his fingers in the striking zone is increased.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A trap of the type for killing mice or rats comprising a molded plastic base hingedly securing a striker at an elevated position adjacent an upper corner area of said base either side thereof, said striker being of a molded plastic and including journal means either side of said striker received in appropriately sized apertures in said base adjacent said upper corner areas, at least one coil spring carried on one of said journals with one end of said spring partially overlying said striker and the opposite end retained by a surface of said base to cause a strong spring bias urging said striker to a non-operative position in engagement with a forward portion of said base, and actuator means hingedly secured to said base and movable to a position for setting said striker in an operation position and when depressed moving to a non-maintaining position freeing said striker to move under the influence of said at least one spring to said non-operative position, wherein said actuator means is a separate plastic component hingedly secured either side of said base and extending rearwardly of said base to a point of engagement with said striker when said striker is in the operative position, and wherein at least one of said journals include two sections, a first cylindrical section which supports said at least one spring, and a second cylindrical section exterior to said first section and of reduced diameter for cooperating with the aperture in said base.

2. A trap as claimed in claim 1, wherein each of said journals has a single coil spring associated therewith.

3. A trap as claimed in claim 2, wherein said journals are disposed below the upper surface of said striker.

4. A trap as claimed in claim 3, wherein said actuator has a sunken recess for receiving bait adjacent one end of said actuator.

5. A trap as claimed in claim 4, wherein said actuator includes a bottom rest member for limiting movement of said actuator in said base and to cause said actuator to generally be positioned to allow a portion of said striker to move therepast and be retained by depressing the actuator against the portion of said striker moved past said actuator.

6. A trap of the type for killing mice or rats comprising a molded plastic base hingedly securing a striker at an elevated position adjacent an upper corner area of said base either side thereof, said striker being of a molded plastic and including journal means either side of said striker received in appropriately sized apertures in said base adjacent said upper corner areas, at least one coil spring carried on one of said journals with one end of said spring partially overlying said striker and the opposite end retained by a surface of said base to cause a strong spring bias urging said striker to a non-operative position in engagement with a forward portion of said base, and actuator means hingedly secured to said base and movable to a position for setting said striker in an operation position and when depressed moving to a non-maintaining position freeing said striker to move under the influence of said at least one spring to said non-operative position, wherein said striker has a downwardly angled front portion and a downwardly angled rear portion.

7. A trap as claimed in claim 6, wherein said base includes integrally molded bearings for each of said actuator and said striker.

8. A trap of the type for killing mice or rats comprising a base, a striker hinged to said base at an elevated position, spring means in engagement with said base and said striker urging the striker to a striking position near the front of said base, an actuator pivotally secured to said base intermediate the length thereof with one end of said actuator extending beyond said base opposite said striking position for cooperation with said striker to releasably retain the same in a set position removed from said striking position, said striker extending rearwardly of said base and movable through an angle less than 90° past a portion of said actuator which passes through an aperture in said striker whereafter depression of the portion of said actuator extending through said striker upon release of said striker will cause said striker to be retained by said actuator in said set position.

9. A trap as claimed in claim 8, wherein said actuator includes stop means for generally positioning said actuator to pass through said aperture in said striker when said striker is moved to the set position.

10. A trap as claimed in claim 9, wherein said actuator includes an integral sunken bait retainer adjacent one end thereof which forms part of said stop means.

11. A trap as claimed in claim 10, wherein said base, said striker and said actuator are of a molded plastic material.

12. A trap as claimed in claim 10, wherein said striker is shaped such that the hinge axis of said striker when received in said base is generally adjacent the apex defined between a front of said striker and a rear plane of said striker which are so disposed to reduce the angle through which said striker is moved from said striking position to said set position.

13. A trap as claimed in claim 12, wherein said reduced angle is less than 60°.

14. A trap as claimed in claim 12, wherein said reduced angle is about 45 degrees.

15. A trap as claimed in claim 13, including stop means in said base which limit movement of said striker to an end position marginally below the adjacent edge of said base at said strike position.

* * * * *